United States Patent
Dewhirst

(10) Patent No.: US 9,482,266 B2
(45) Date of Patent: Nov. 1, 2016

(54) CONNECTOR FOR A TUBULAR COMPOSITE SHAFT

(75) Inventor: Michael James Dewhirst, Stratford Upon Avon (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 1522 days.

(21) Appl. No.: 12/734,794

(22) PCT Filed: Feb. 11, 2008

(86) PCT No.: PCT/GB2008/003886
§ 371 (c)(1),
(2), (4) Date: Oct. 4, 2011

(87) PCT Pub. No.: WO2009/066070
PCT Pub. Date: May 28, 2009

(65) Prior Publication Data
US 2012/0060636 A1 Mar. 15, 2012

(30) Foreign Application Priority Data

Nov. 23, 2007 (GB) .................................. 0722933.9
Jul. 14, 2008 (GB) .................................. 0812801.9

(51) Int. Cl.
F16C 3/02 (2006.01)
F16C 7/02 (2006.01)
F16C 7/06 (2006.01)

(52) U.S. Cl.
CPC ............. *F16C 3/026* (2013.01); *F16C 7/026* (2013.01); *F16C 7/06* (2013.01); *Y10T 29/49963* (2015.01); *Y10T 74/20177* (2015.01); *Y10T 403/471* (2015.01)

(58) Field of Classification Search
CPC .................. Y10T 403/471; Y10T 403/7062; Y10T 403/7067; Y10T 403/7064; Y10T 403/7066; Y10T 403/7069; Y10T 74/2151; F16C 3/02; F16C 7/00; F16C 7/06; F16B 7/18
See application file for complete search history.

(56) References Cited

U.S. PATENT DOCUMENTS 3,669,193 A * 6/1972 Cooper .................. A01B 21/08
172/570
3,721,134 A 3/1973 Lamke
(Continued)

FOREIGN PATENT DOCUMENTS

DE 3804901 A1 8/1989
FR 2343918 A1 10/1977
(Continued)

OTHER PUBLICATIONS

GB Search Report for Application No. GB0812801.9, Search completed on Oct. 28, 2008, 1 page.
International Search Report for International Application No. PCT/GB2008/003886, Mailed Mar. 17, 2009, 3 Pages.

*Primary Examiner* — Jonathan Masinick
(74) *Attorney, Agent, or Firm* — Cantor Colburn LLP

(57) ABSTRACT

A load transmitting connector 13 for composite tube 11 and a method of attachment of said connector 13 to the tube 11, the connector 13 comprising a screw threaded nut 14 having an outer surface 18 shaped to receive the composite, an annular collar 15, a screw threaded end fitting 16 for engaging the screw thread within the nut 14, and a load means 17, wherein the nut 14 is incorporated within said one end of the tube during tube manufacture, the tube 11 being cured with the nut 14 in situ, the annular collar 15 is placed over said one end of the tube, the end fitting 16 is screwed into the nut, and the load means 17 in use axially moving the end-fitting 16 relative to the collar 15 to exert a clamping load on the composite tube.

16 Claims, 2 Drawing Sheets

(56) References Cited

U.S. PATENT DOCUMENTS

| | | | |
|---|---|---|---|
| 4,295,389 A * | 10/1981 | Geisthoff | A01B 59/004 280/482 |
| 5,082,314 A | 1/1992 | Aubry | |
| 5,360,283 A * | 11/1994 | Browning | F16D 1/095 403/261 |
| 6,190,263 B1 | 2/2001 | Kimoto et al. | |
| 2001/0001769 A1 | 5/2001 | Kimoto | |

FOREIGN PATENT DOCUMENTS

| | | |
|---|---|---|
| GB | 2008720 A | 6/1979 |
| GB | 2215008 A | 9/1989 |
| GB | 2424464 A | 9/2006 |
| GB | 2435317 A | 8/2007 |
| JP | 2004293716 A | 10/2004 |
| WO | 2004097233 A1 | 11/2004 |

* cited by examiner

US 9,482,266 B2

CONNECTOR FOR A TUBULAR COMPOSITE SHAFT

FIELD OF THE INVENTION

This invention relates to a connector for mechanically joining a composite tubular shaft to another component and which permits the transfer of axial loads between the shaft and component.

BACKGROUND OF THE INVENTION

Composites are becoming more widely recognized as a viable solution to a range of applications due to their inherent strength to weight ratio, and the ability to more accurately analyze the composite structure at the design phase. Composite tubular structures are currently applied in many fields, for example, motor sport, aerospace and medical. In use, composite tubular structures may be subjected to axial tensile and compressive loads, bending and torsional loadings. With increasing demand to transmit the working load directly through to the composite structure comes a requirement to design a suitable composite to end fitting or connector. The connector is required to connect the composite tubular structure to another component in such a way that the load path is optimised to the behaviour of the composite element. In high performance situations the connection device employed will ideally be designed such that it does not damage the composite matrix during assembly or usage. Such connectors are shown in the applicants published Patents GB2424 464B and GB 2435 317B. Ideally the connection device and subsequent joint between the composite and surrounding structure will be stronger than the composite tubular structure itself.

A known joint for transmitting axial loads to composite tubular structures is shown in U.S. Pat. No. 5,082,314 and comprises an annular band embedded in the external surface of the tube and end cap which connects to the band.

STATEMENT OF THE INVENTION

According to a first aspect of the present invention there is provided a connector for connecting a composite tube, tubular rod or shaft to another component and which comprises a screw threaded nut the outer surface of which is shaped to receive in use composite material applied around the nut in a green state during tube manufacture, an annular collar for placement over the nut and composite material, a screw threaded end fitting which engages the screw thread within the nut, and a load means in use axially moving the collar relative to the end fitting to exert a clamping load onto the composite material surrounding the nut.

The connector may be utilised with different composite matrices. The fibre alignment in a composite structure may be uni-directional or multiaxial and therefore manufactured by composite stitching, lay-up, filament winding or any other process for producing the composite element. The composite structure can also be produced from any fibre and matrix although typical choices are carbon or glass for the fibre, and thermoset or thermoplastic polymers for the matrix.

The material of the connector may be determined by the nature and magnitude of the desired load case and environmental conditions. That is to say that all engineering materials are open for consideration including metals, polymers, fibres and ceramics. The manufacturing technique for the end fittings will subsequently be determined by the selected material, annual volumes and required dimensional accuracy. Preferably the connector is formed from stainless steel.

Since the composite tube is clamped between the nut and external collar the connector is particularly suitable for transmitting axial compressive and tensile loads. There is no need for adhesives or rivets to transfer the loads from the surfaces of the metal components to the surface of the composite tube—it all relies on the mechanical action where the nut is pulled while the collar is pushed, thereby generating the clamping load on the composite. The clamping load is always of greater magnitude than the axial tensile or compressive loads that the system is under and therefore there is no relative movement between the surfaces of the composite and the metal nut or collar which could cause fretting fatigue failure. The design can be adopted to a tubular structure subjected to any combination of axial, bending and torsional loads, depending upon the specific design and package requirements.

Preferably, the external surface of the nut is substantially ovoid, more preferably comprising two back to back frustoconical surfaces so that the composite is flared outwards, then tapered inwardly (as measured radially from the axis of the tubular structure) so as to create a feature to securely clamp against. The frustoconical surfaces may be roughened to increase frictional resistance to rotational movement between the nut and tubular composite.

The end fitting may be provided with an annular flange and the load means acts between the flange and the collar to exert the clamping load on the composite tube.

The load means comprise a plurality of circumferentially spaced screw means acting between the flange and collar. Preferably the screw means are bolts or screws mounted on the flange and which abut the collar. The clamp force is generated by rotation of the screws to further increase the axial spacing of the flange from the collar, i.e. the flange pulls the threaded nut while pushing the collar, thereby generating a clamping force on the composite between the collar and the nut. The clamping force on the composite ensures there is no relative movement between the surfaces of the composite and the nut or collar which could be a cause of fatigue failure by fretting.

The invention further comprises a composite tube having a connector in accordance with the first aspect of the present invention fitted to at least one end thereof, the nut being incorporated into end of the tube.

Yet another aspect of the invention provides a composite control rod comprising a composite tubular body having an end connector, according to the first aspect of the invention, fixed to at least one end of the control rod for the transmission of compressive and tensile loads along the rod, the nut being incorporated within an end portion of the composite tubular body. The control rod may be provided with an end connector fixed at each end of the rod.

The clamping load exerted on the composite tube between the nut and external collar, may be greater than the tensile and compressive loads to be transmitted along the control shaft in use.

The overall length of the control rod may be adjusted by releasing the clamping load and screwing the end fitting in one direction or the other to reposition the end fitting relative to the nut, and then re-applying the clamping load.

Yet another aspect of the invention provides a method of attachment of a load transmitting connector to at least one end of tubular composite tube, rod or shaft wherein in said method there is provided a connector comprising a screw threaded nut the outer surface of which is shaped to receive in use composite, an annular collar, a screw threaded end fitting for engaging the screw thread within the nut, and a load means in use axially moving the end-fitting relative to the collar and exerting a clamping load said one end, wherein the nut is incorporated within said one end of the tube during tube manufacture, the tube is cured with the nut in situ, the annular collar is placed over said one end, the end fitting is screwed into the nut, and the load means is operated to move the end fitting relative to the collar and clamp said end of the composite tube between the collar and nut.

The clamping load exerted on the composite tube may be varied as is desired for the particular end use of the control rod.

The end of the tube is releasably clamped allowing the end fitting to be adjustably displaced relative to the nut.

DESCRIPTION OF THE DRAWINGS

The invention will be described by way of example and with reference to the accompanying drawings in which.

DETAILED DESCRIPTION OF THE INVENTION

Figure 1:
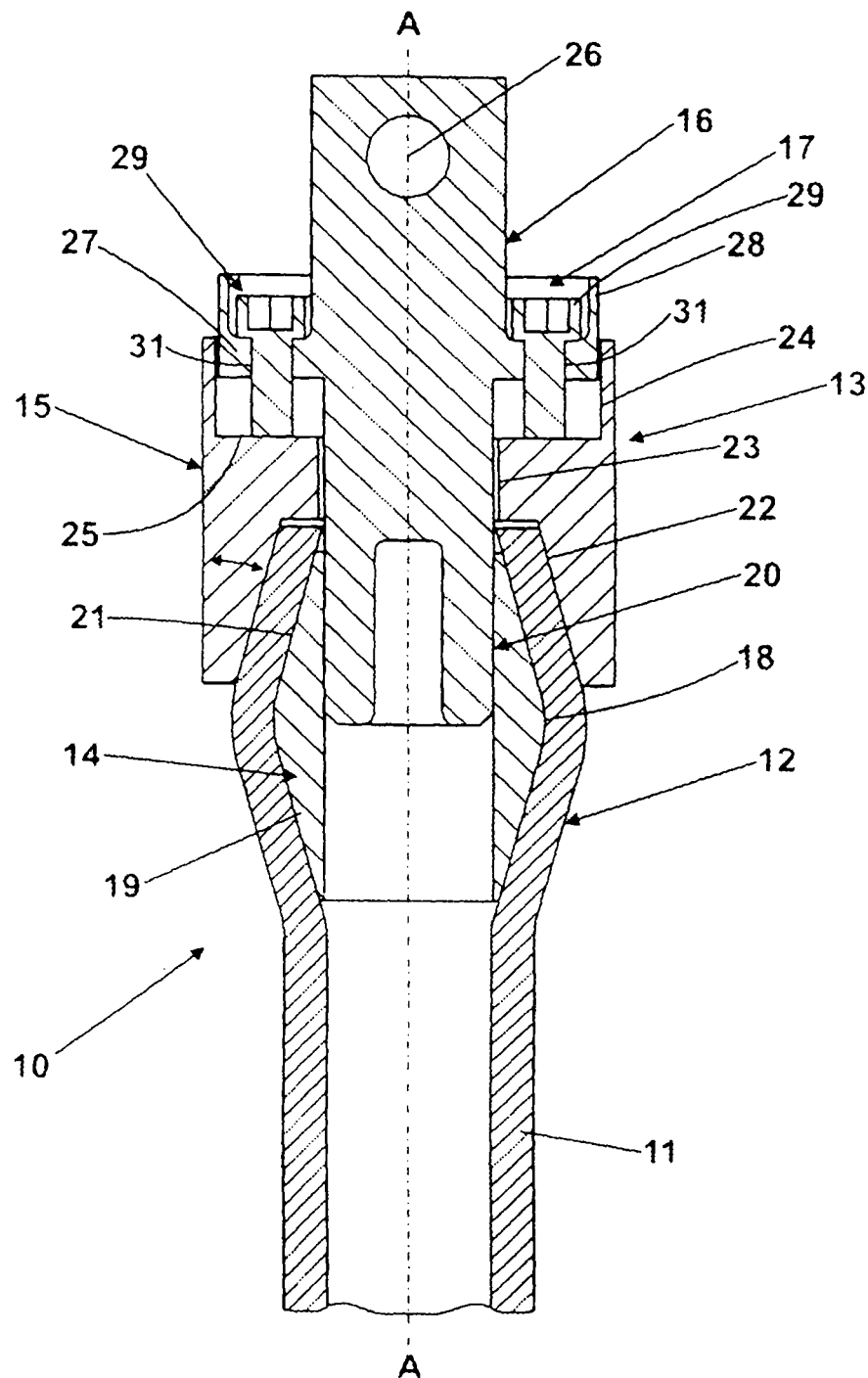
FIG. 1 is a longitudinal cross-section through one end of a composite tube having mounted thereon a connector according to the present invention.
Figure 2:
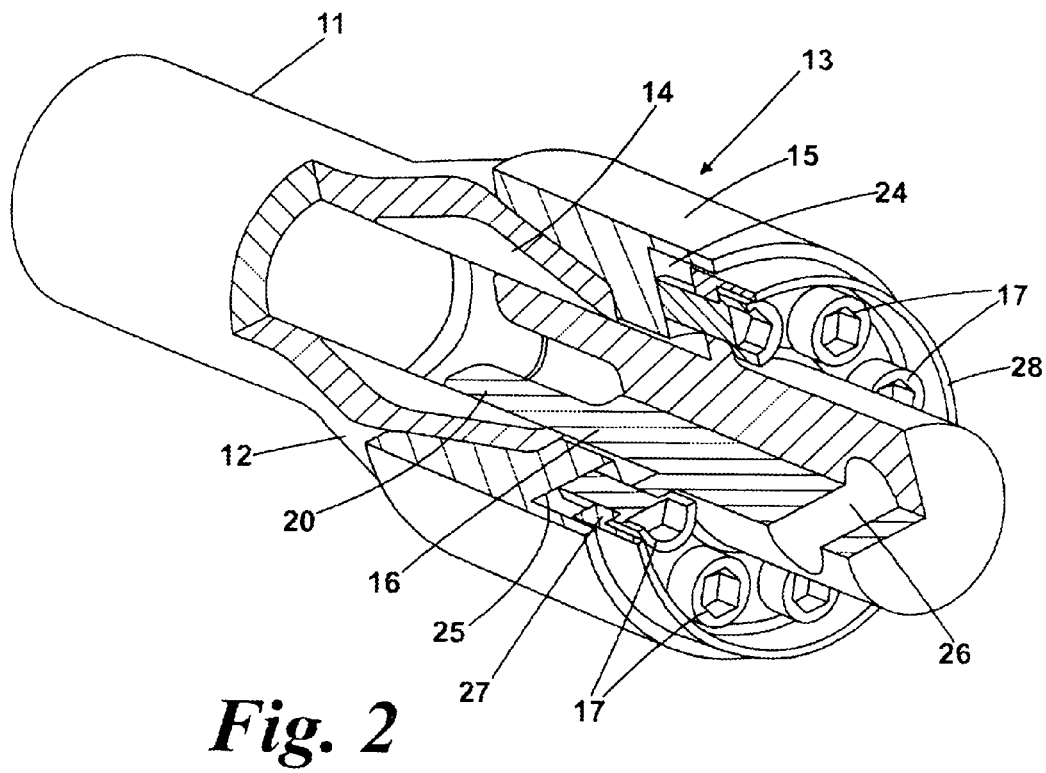
FIG. 2 is an isometric sectional view of the tube and connector shown in FIG. 1.
Figure 3:
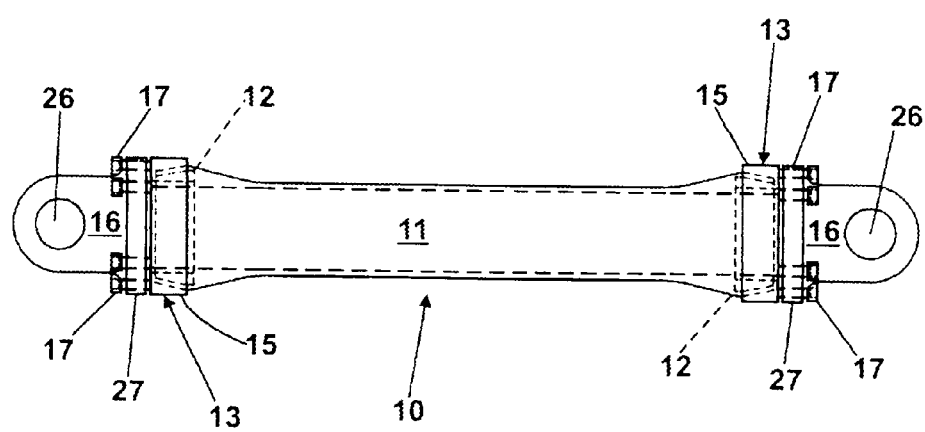
FIG. 3 is a side elevation of the control shaft having a connector at each end.

Referring to FIGS. 1-3 of the drawings, there is shown a composite tubular control shaft or rod 10 according to the present invention. The control shaft 10 comprises a composite shaft 11 with a connector 13 fitted to one or both end portions 12. A typical control shaft 10 may be 600 mm in length and the composite shaft 11 has a tubular construction having an outside diameter of about 66 mm and an inner diameter of about 60 mm. The connector 13 may be formed from stainless steel and includes a nut 14 which is incorporated within the end portion 12 of the tube 11 by having the composite material moulded, formed or wound around it during the manufacturing process. This will result in the nut 14 becoming an integral part of the composite structure which cannot be removed from the tubular structure without damage to the surrounding composite structure.

The nut 14 is internally threaded and the external surface 18 is substantially ovoid comprising two back to back frustoconical surfaces 19, 21 so that the composite tube is flared outwards, then tapered inwardly (as measured radially from the axis A-A of the tubular structure) securely trapping the nut 14 within the end portion of the cured composite and creating a feature for clamping against.

The frustoconical surfaces 19, 21 may be serrated or otherwise roughened to increase frictional resistance to rotational movement between the nut and tubular composite if desired.

The shaft 11 is preferably formed from composite comprising carbon fibre with a resin matrix of an epoxy bisphenol A resin and an anhydride curing agent. Impregnated carbon tow is wound onto a mandrel in a plurality of layers with the nut 14 in place on the mandrel. The composite is then cured with the nut held in place. The volume fraction of carbon fibre in the composite is typically in the order of 65%.

The connector 13 further includes an external annular collar 15 which is placed over the outside of the end portion 12 of the composite tube 11 and which in turn is held in place by an end fitting 16, which itself is screwed directly into the internal threaded nut 14, and a load means 17 mounted on the end fitting 16.

The collar 15 has a through bore 23 to accommodate the end fitting 16. The end portion 22 of the through bore 23 adjacent the composite tube 11 has an internal frustoconical surface which is substantially parallel with the tapered surface 21 on the nut 14. The nature of the tapered angles employed on the two opposed clamping surfaces of the external collar 15 and nut 14, preferably between 5° and 40° and more preferably between 10° and 25°, provides a clamp load to couple the connector to the end portion 12 of the composite structure and to transmit the working load through to the composite tubular structure 11. The taper and flare angles in the present example are 10°. The other end portion 24 of the through bore 23 comprises a larger diameter portion 24 forming an annular shoulder 25 within the collar 15.

The end fitting 16 has an elongated screw threaded shank 20 which engages the nut 14 and is provided with a suitable manner of joint 26 for connection to a further component (not shown). In this case the joint 26 is a diametral bore for accommodating a clevis pin, but any other suitable joint may be provided on the end fitting, for example the ball of a ball and socket joint, a universal joint etc. The end fitting 16 has a radially outwardly projecting annular flange 27 located midway along its length which has an axially extending cylindrical sidewall 28 thereon. The sidewall 28 extends away from the collar 15 and forms a cavity for housing the load means 17.

The load means 17 comprises a plurality of set screws 29, preferably six but any number may be provided as is desired, mounted on the flange 27. The screws 29 are mounted in screw threaded holes 31 circumferentially spaced around the flange 27. The end fitting 16 when screwed into the nut 14 is locked in position by screwing the set screws 29 into abutment with the shoulder 25 and a clamping force is generated by rotation of the set screws to increase the axial spacing the flange 27 from the collar 15. Each screw is tightened in stages to a set torque load, in this example to about 15-16 kN. With the end fitting 16 screwed directly into the internal threaded nut 14, the force pulling the internal threaded jut 14 out of the tubular structure is reacted against the clamping load generated by the collar 15 against the tapered end portion 12 of the composite. The subsequent interface between the tubular composite structure and connector 13 is made resistant to fatigue and fretting by the magnitude of the pre-load generated, making the system tolerant of dynamic loading. A suitable pre-load should be greater than the expected tensile and compressive loads to be transmitted through the control shaft. A suitable pre-load for the present control shaft/rod is about 80 kN.

The control shaft 10 formed by the connectors 13 and composite tube 11 performs over a wide range of temperatures, from cryogenic to elevated and may form a control shaft of the type of the type used in aircraft wings for the operation of flaps.

The control shaft 10 permits adjustment of its overall length. This is advantageous in use of the shaft 10 as the location of the fixed points within a surrounding component structure to which the shaft 10 may be mounted, will be subject to a certain tolerances. The length of adjustment within the assembled composite tube and connector is controlled by how far the screw threaded shank 20 of the end fittings 16 may be screwed into or out of the nut 14 Adjustment is permitted by slackening the screws 29. After adjustment to a desired length, the 'slack' left between the end fitting 16 and the external collar 15 is then taken up by the tensioning screws 29.

For a control shaft having a connector 13 at each end as shown in FIG. 3, then a left hand thread may be provided at one end of the tubular structure, and a right hand thread at the other. By constraining the end fittings it will then be possible to rotate the composite tubular structure clockwise or anticlockwise to extend or contract the overall length of the shaft. Once again, when the desired length has been achieved, the tensioning screws will be torqued up to take out any play rendering the assembly rigid and ready to take the designed loading.

What is claimed is:

1. A composite tubular shaft having a connector fitted to at least one end portion thereof, the connector for connecting the composite tubular shaft to another component and comprising a screw threaded nut incorporating within said one end portion of the tubular shaft and having an external surface of which is shaped to receive in use composite material applied around the nut in a green state during shaft manufacture, wherein the external surface of the nut comprises two back to back frustoconical surfaces wherein one of the frustoconical surfaces is tapered from the midpoint of the nut to a first end of the nut and the other of the two frustoconical surfaces is tapered from the midpoint of the nut to an opposite end of the nut, so that the tubular shaft is flared outwards and inwards around the nut to securely trap the nut within said one end portion of the tubular shaft when cured, an annular collar for placement over the nut and composite material, a screw threaded end fitting which engages the screw thread within the nut, and a load means in use axially moving the collar relative to the end fitting to exert a clamping load onto the composite material surrounding the nut.

2. A connector as claimed in claim 1 wherein the external surface of the nut is substantially ovoid.

3. A connector as claimed in claim 2, wherein the frustoconical surfaces are inclined at between 5° and 40° to the axis of rotation of the nut.

4. A connector as claimed claim 1, wherein the external surfaces of the nut are serrated or otherwise roughened to increase frictional resistance to rotational movement between the nut and tubular composite.

5. A connector is claimed in claim 1, wherein the collar has a through bore to accommodate the end fitting and the end portion of the through bore adjacent the nut has an internal surface which is substantially parallel with the adjacent surface on the nut.

6. A connector as claimed in claim 1, wherein the end fitting is provided with an annular flange and the load means acts between the flange and the collar to exert the clamping load on the composite tube.

7. A connector as claimed in claim 6 wherein the load means comprise a plurality of circumferentially spaced screw means acting between the flange and collar, the clamp force being generated by rotation of the screw means to further increase the axial spacing of the flange from the collar.

8. A connector as claimed in claim 7 wherein the screw means are bolts or screws mounted on the flange and which abut the collar.

9. A composite control rod comprising a composite tubular body having an end connector according claim 1 fixed to at least one end of the control rod for the transmission of compressive and tensile loads along the rod, wherein the nut is incorporated within an end portion of the composite tubular body, the screw threaded end fitting engaging the screw thread within the nut, and the load means in use axially moving the end-fitting relative to the collar and to exert a clamping load onto the composite material surrounding the nut.

10. A control rod as claimed in claim 9, wherein the clamping load exerted on the composite tube between the nut and external collar, is greater than the intended tensile and compressive loads to be transmitted along the control shaft in use.

11. A control rod as claimed in claim 9 having a said end connector fixed to each end of the rod.

12. A control rod as claimed in any one of claim 9, wherein the overall length of the control rod may be varied.

13. A control rod as claimed in claim 12, wherein the end filling has a elongate screw threaded shaft and may be adjusted relative to the nut by releasing the clamping load and screwing the end fitting in one direction or the other to reposition the end fitting relative to the nut, and then re-applying the clamping load.

14. A method of attachment of a load transmitting connector to at least one end of a composite tube, wherein in said method there is provided a connector comprising a screw threaded nut the outer surface of which is shaped to receive in use composite, an annular collar, a screw threaded end fitting for engaging the screw thread within the nut, and a load means in use axially moving the end-fitting relative to the collar and exerting a clamping load said one end, wherein the nut is incorporated within said one end of the tube during tube manufacture, the tube is cured with the nut insitu and wherein the outer surface of the nut comprises two back to back frustoconical surfaces wherein one of the frustoconical surfaces is tapered from the midpoint of the nut to a first end of the nut and the other of the two frustoconical surfaces is tapered from the midpoint of the nut to an opposite end of the nut, and the tube is flared outwards and inwards around the nut to securely trap the nut within said one end of the tube when cured, the annular collar is placed over said one end, the end fitting is screwed into the nut, and the load means is operated to move the end fitting relative to the collar and clamp said end of the composite tube between the collar and nut.

15. A method as claimed in claim 14, wherein the clamping load can be set as is desired.

16. A method is claimed in claim 14, wherein the collar is releasably clamped against the tube allowing end fitting to be adjustably displaced relative to the nut.

\* \* \* \* \*